(No Model.) 5 Sheets—Sheet 1.

N. W. PRATT.
REVOLVING STOKER.

No. 485,224. Patented Nov. 1, 1892.

WITNESSES: INVENTOR

BY ATTY.

(No Model.)　　　　　　　　　　　　　　　　　　　5 Sheets—Sheet 2.
N. W. PRATT.
REVOLVING STOKER.
No. 485,224.　　　　　　　　　Patented Nov. 1, 1892.
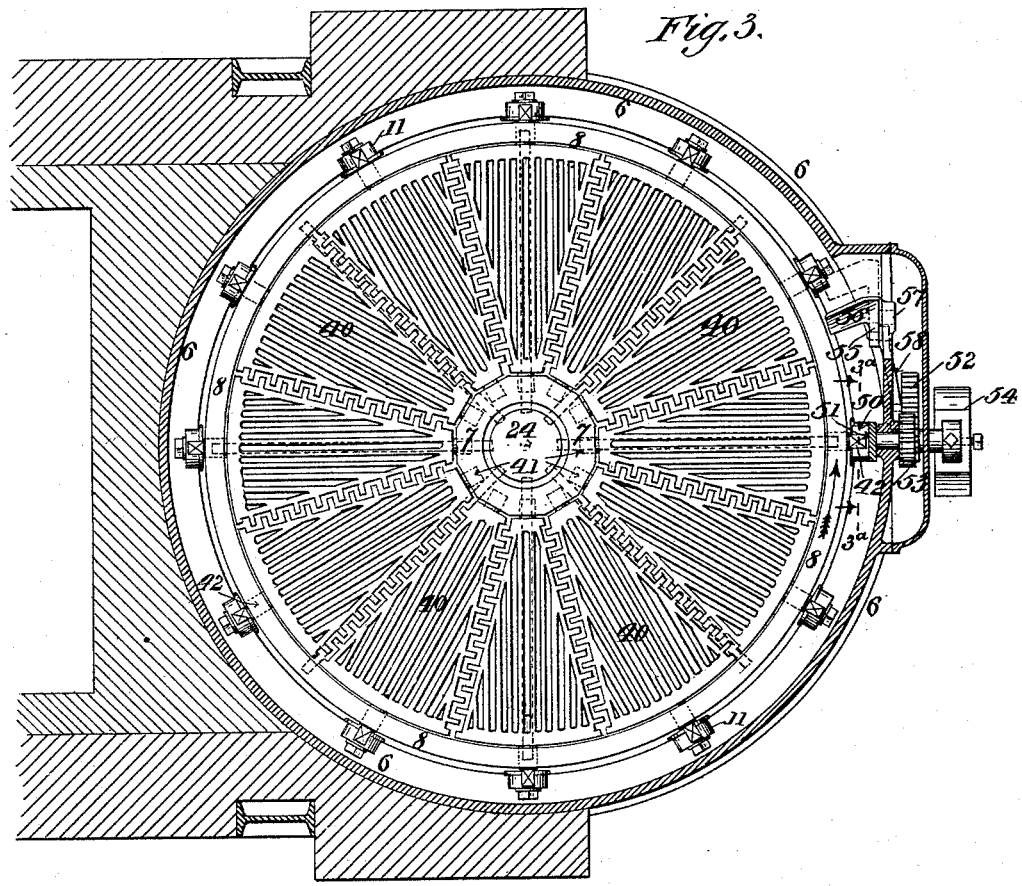
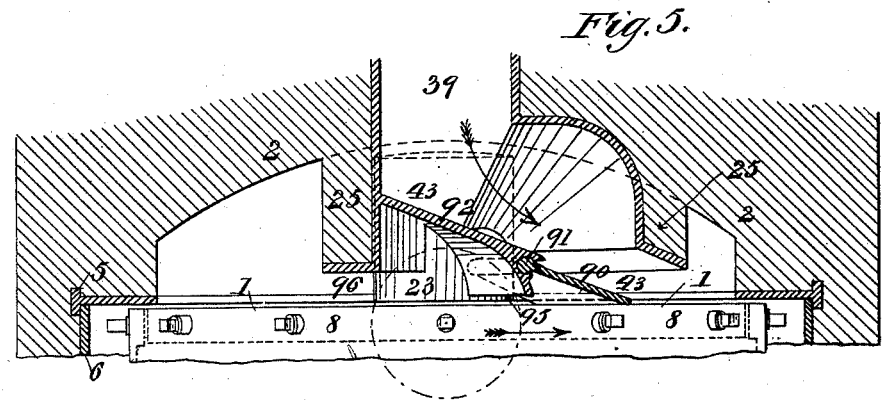
WITNESSES:　　　　　　　　　　　　　　　INVENTOR (No Model.) 5 Sheets—Sheet 3.
N. W. PRATT.
REVOLVING STOKER.
No. 485,224. Patented Nov. 1, 1892.
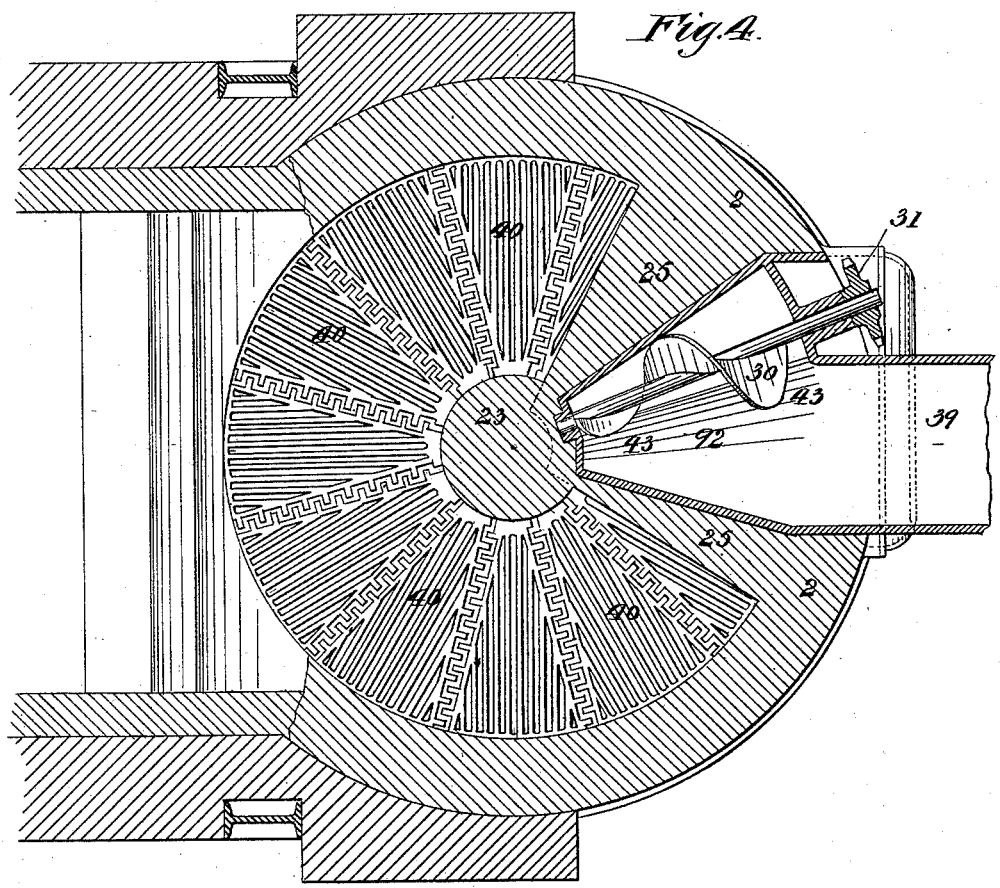
*Fig. 4.*
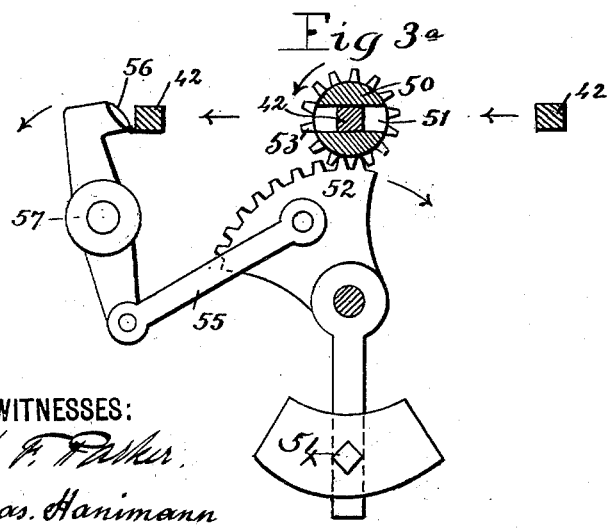
*Fig. 3ª*
WITNESSES:
INVENTOR (No Model.) 5 Sheets—Sheet 4.

N. W. PRATT.
REVOLVING STOKER.

No. 485,224. Patented Nov. 1, 1892.

WITNESSES:
H. F. Parker
Chas Hanimann

INVENTOR
Nat W. Pratt

BY Chas W. Forbes ATTY.

(No Model.) 5 Sheets—Sheet 5.
N. W. PRATT.
REVOLVING STOKER.
No. 485,224. Patented Nov. 1, 1892.
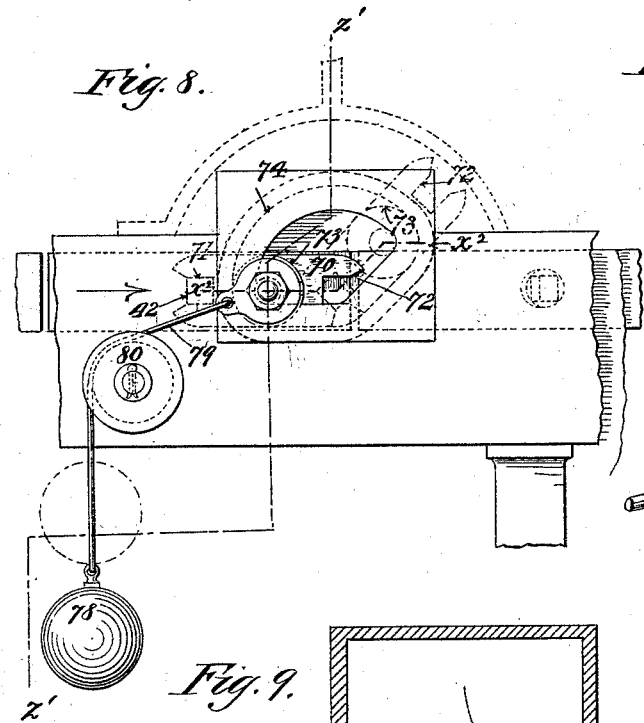
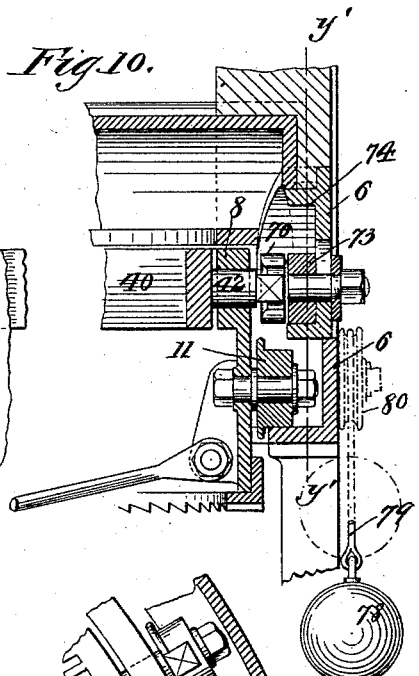
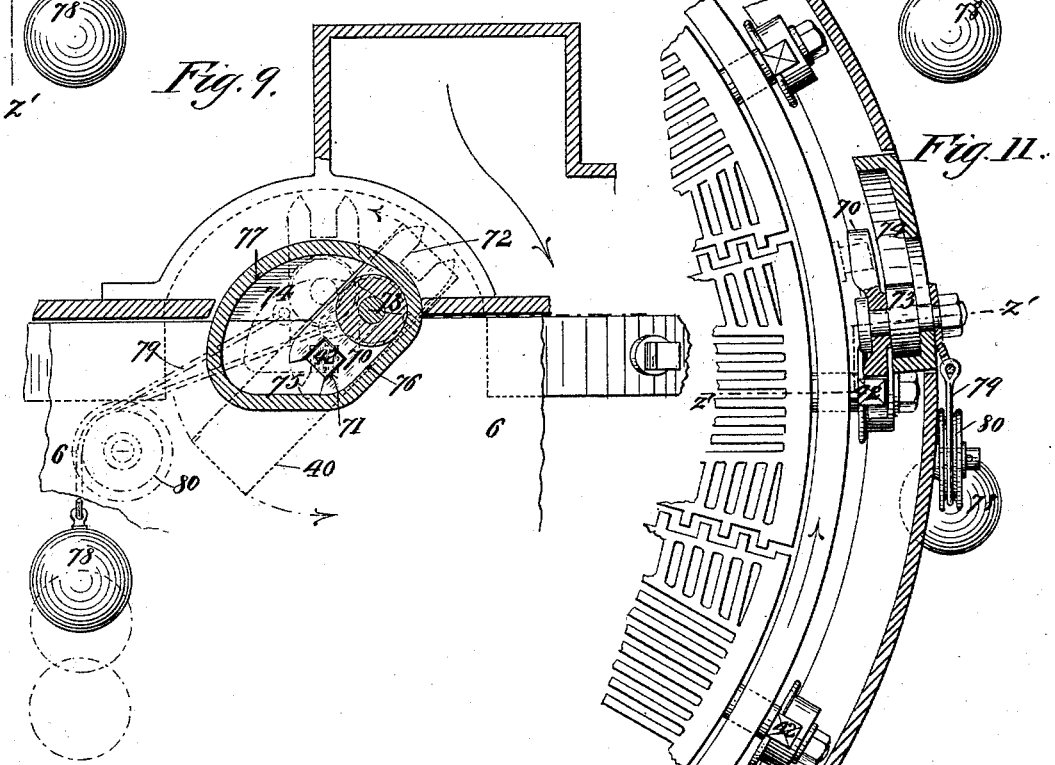
WITNESSES:
H. F. Parker
Chas. Hanimann
INVENTOR
Nat. W. Pratt
BY Chas W. Corbin ATTY.

UNITED STATES PATENT OFFICE.

NAT. W. PRATT, OF BROOKLYN, NEW YORK.

REVOLVING STOKER.

SPECIFICATION forming part of Letters Patent No. 485,224, dated November 1, 1892.

Application filed May 14, 1890. Serial No. 351,773. (No model.)

*To all whom it may concern:*

Be it known that I, NAT. W. PRATT, a citizen of the United States, residing at Brooklyn, in the county of Kings and State of New York, have invented certain new and useful Improvements in Revolving Stokers, of which the following is a specification.

My invention consists of a horizontal rotary grate made up of a series of radially-pivoted sectoral sections, which are dumped automatically by the movement of the grate, so as to completely discharge each of their loads in succession after the fuel is burned. There is a central pier supported through the core of the rotary frame, and from this pier to the front of the arch covering the grate there is a bridge, under which the sectors pass while they are being dumped and are then supplied with fresh fuel as they resume a horizontal position. There is therefore an essential relation between the sectors and the bridge, the latter acting to prevent the admission of an undue amount of air through the frame when a sector is thrown out of its normal position; and my present invention therefore also includes a certain improved construction of the bridge covering the dumping-point of the sectors, whereby the fuel is fed over the bridge to replenish the sectors as soon as they pass out, said fuel itself forming a seal to prevent the admission of air on the replenishing side of the bridge, which would interfere with the proper course of draft through the incandescent body of fuel.

My invention also consists of certain novel mechanism for dumping the grates and restoring them to a normal position.

My invention also consists in a novel construction of the rotary frame carrying the grate.

Figure 1:
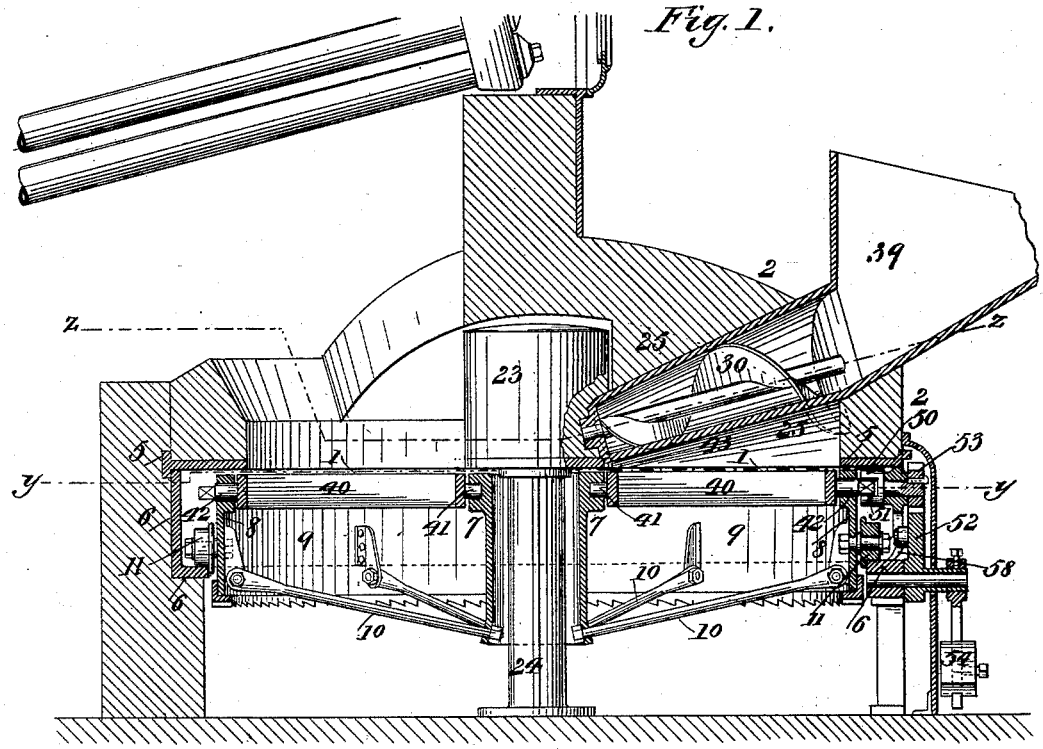
Figure 2:
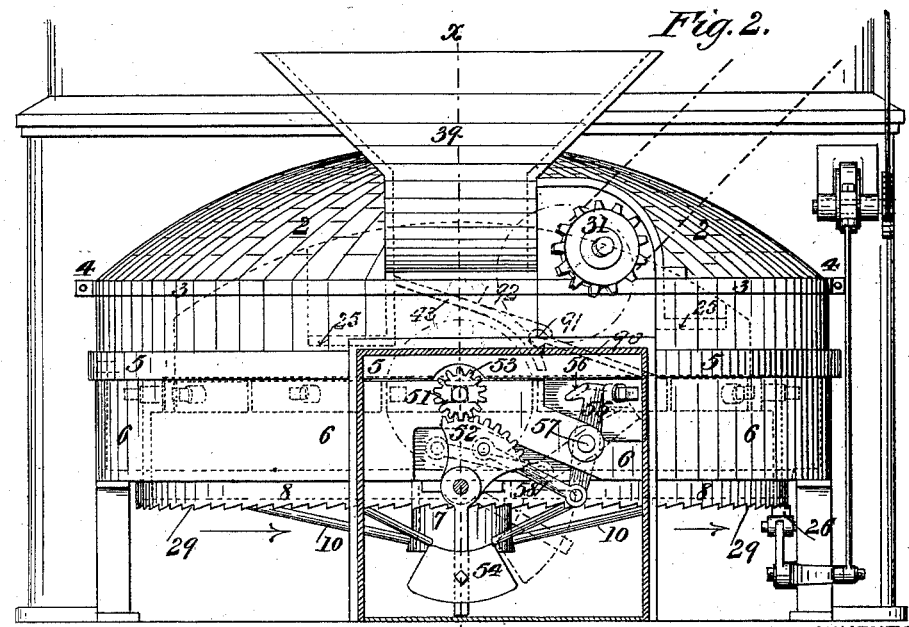
Figure 6:
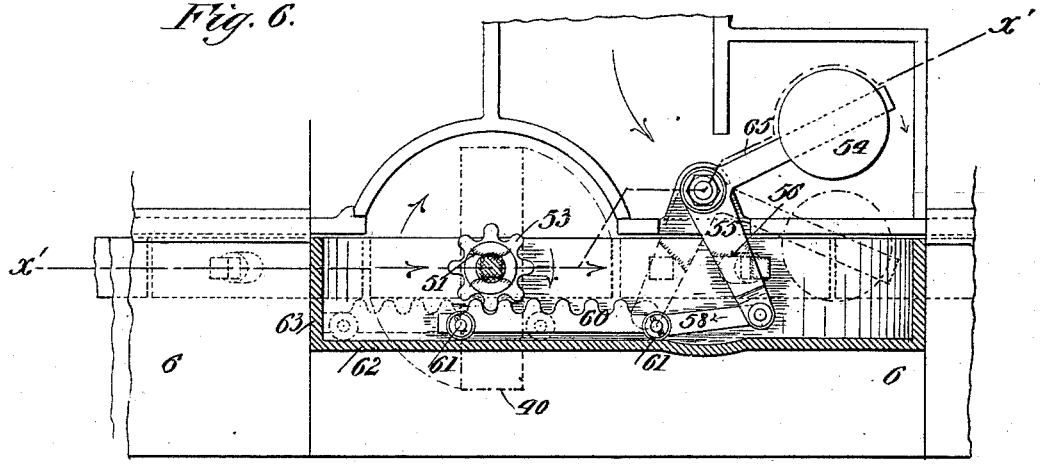
Figure 7:
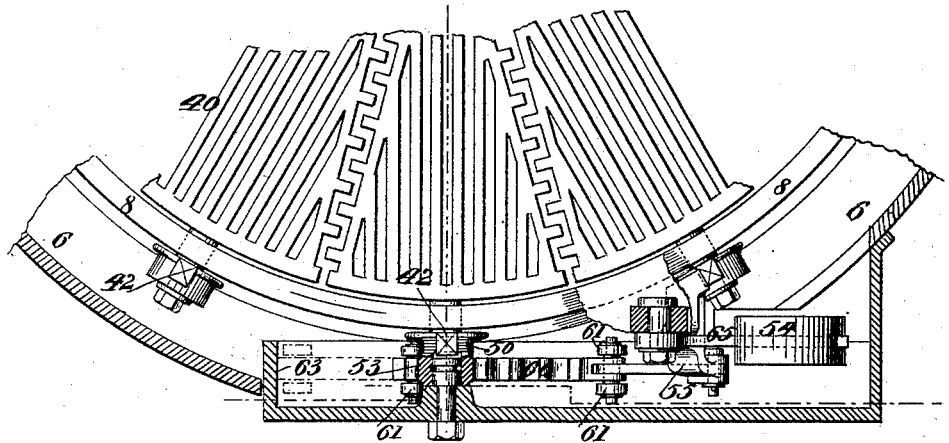

Referring to the accompanying drawings, Figure 1 is a longitudinal sectional elevation on the line $xx$, Fig. 2, of a furnace and rotary grate adapted to a steam-boiler; Fig. 2, a front elevation; Fig. 3, a horizontal section on the line $yy$, Fig. 1. Fig. $3^a$ is an enlarged sectional elevation on the line $3^a$ of Fig. 3 of the devices for rotating the disk 50, looking from the inside of the same devices shown in Fig. 2; Fig. 4, a horizontal section on the line $zz$, Fig. 1; Fig. 5, a front sectional elevation of a similar grate, showing the feature of improvement in the bridge; Fig. 6, a partial front elevation, partly in section, showing a modified form of dumping device; Fig. 7, a horizontal sectional view of the same on the line $x' x'$; Fig. 8, a partial front elevation of a further modification of the dumping device; Fig. 9, a sectional front elevation on the line $y' y'$, Fig. 10 showing the same in a different position; Fig. 10, a vertical section on the line $z' z'$, Figs. 8 and 11; and Fig. 11, a horizontal section on the line $x^2 x^2$, Fig. 8.

1 is a circular grate, which may be placed wholly or partly underneath the boiler, as the circumstances require. In the drawings the furnace is shown placed half outside of the boiler-front, the outside portion being covered with a dome 2, the thrust of which is received by a cast ring 5, in addition to which there is a wrought-iron band 3, the ends of which are fastened at the points 4 4 to the front wall of the boiler. The wrought-iron band takes the thrust of the upper outside portion of the ring of thrust-blocks supporting the dome and the cast ring 5, in which this ring of thrust-blocks is set, rests upon a second circular casting 6, built into the wall, which also forms the track upon which the grate is revolved and supported. The grate 1 is composed of a series of sectors trunnioned radially in the hub 7 and periphery 8 of the circular frame 9. The hub and periphery of the frame 9 are joined together by a series of radial suspending-rods 10, composing a wheel-like frame in which the hub is suspended from the rim. The frame 9 is supported by rollers 11 upon the circular track 6, built into the brickwork. The grate-frame may be rotated by any suitable means—such as a ratchet 29—placed on the bottom of the rim 8, the pawl mechanism 26 engaging therewith.

23 is the central pier, supported through the hollow core or hub 7 of the grate upon the column 24. Between the pier 23 and the front arch of the dome 2 is suspended the bridge 25, over which the fuel is fed from a hopper 39 by means of a spiral feeder 30. This feeder is driven by means of a sprocket-wheel 31 on its shaft or other suitable gearing. The sectors 40 of the grate are trunnioned at 41 42 radially in the frame 7 8, the trunnions being central to the grates, balancing them. When the sectors reach a point in rotation under the feeding-plate 43 of the bridge, they are dumped automatically, so as to completely discharge the burned fuel, and in so dumping they make a complete half-revolution upon their trunnions, the grates being double surfaced, so as to burn the fuel upon either side.

It is obvious that a variety of devices may be employed to dump the grates, and I will therefore proceed to describe certain various forms for illustration.

In Figs. 1, 2, 3, and 3ª the ends of the trunnions 42 are squared. The grate rotates in the direction indicated by arrows. 50 is a disk fixed to the inner end of a short shaft that is mounted in bearings in the vertical web of the track 6, and has a groove 51, which is horizontal when the disk is at rest, and through which groove the squared heads of the trunnions pass. When the square head reaches the middle of the groove 51, so that the axis of the grate-sector is coincident with the axis of the disk 50, the latter is quickly given a half-turn, dumping the sector and restoring the same to a normal but reversed position, whence it is carried along to receive fresh fuel by the continuous revolution of the grate-frame, the trunnion-head passing freely out of the said groove.

In Figs. 1, 2, and 3 the mechanism for giving the disk 50 its half-rotation consists of a segment 52, engaging with a pinion 53 on the shaft of the disk 50, which segment is provided with a tumbling-bob 54, attached to its shaft, tending to restore it to a normal position when moved out of the same. 55 is a lever fulcrumed at 57, bearing an inclined face or flange 56 on its upper end, and connected at its lower end to the segment by a connecting-rod 58. As the projecting trunnions 42 approach and come in contact with the flange 56 of the said lever (see Fig. 3ª) the same is moved so as to tilt the segment and the tumbling-bob, revolving the pinion a half-turn, reversing the horizontal position of the groove 51 to an opposite horizontal position before a succeeding trunnion passes into it. The flange 56 is sufficiently prolonged to maintain such reversed position of the disk until the trunnion entering it has reached the central position before referred to, and, the weight 54 then being released, the same quickly reverses the pinion, disk, and grate-sector before the trunnion has passed said central position in the groove 51.

The device shown in Figs. 6 and 7 is similarly operated, differing only in construction, a rectilinear rack 60 being substituted for the segment 52. The rack 60 moves upon rollers 61 on the horizontal plate 62, and in a normal position (shown by dotted lines) abuts on the end of the frame 63 of the plate. The lever 55 in this instance bears the tumbling-bob 54 on its arm 65, and bears an inclined surface 56, (see dotted and full lines, Fig. 6,) which impinges on the upper sides of the square trunnion-heads as they approach and pass under, moving and retaining the pinion 53 and its grooved disk 50 in a reversed position, as before, until a succeeding trunnion reaches the center of the groove, then dumping the grate by the fall of the weight.

In Figs. 8 to 11, inclusive, instead of a grooved disk I employ a tumbling-block 70, having mortised ends 71 72, which fit the square trunnion. This block bears a pivotal roller 73, which operates about the segment-shaped cavity or guide 74. The surface of this guide consists of a flat or horizontal plane surface 75, an inclined plane surface 76, and a segmental cylindric surface 77, concentric with the line of intersection between the said horizontal and inclined surfaces. To the pivot of the roller 73 is attached a weight 78 by a small cable 79, passing over a pulley 80, whereby the tendency of the block is to assume the position shown in Figs. 8 and 11. When the grate-trunnion approaches and enters the mortise 71, the block 70 is advanced by the motion of the grate-frame until the roller 73 reaches the inclined plane 76, ascending the same until, reaching the position in Fig. 9, in which the grate-sector is partially dumped, the tension of the cable in a line aside from the axis of the trunnion pulls the pivot of the block over in an arc parallel with the surface 77 of the guide until a position corresponding again with Fig. 8 is reached, completely overturning the sector. The trunnion then leaves the mortise 71 as the grate rotates and the mortise 72 remains in position to receive the succeeding trunnion.

Referring now to Fig. 5, I illustrate in cross-section the terminus of the feeding-hopper. The plate 90, fulcrumed at 91 in the throat of the hopper, rests at its free edge on the surface of the grate. The fuel, descending through the hopper 39, is fed by gravity. I utilize the motion of the grate itself as the means of carrying away the fuel from beneath the column as fast as required. In order to accomplish this it is necessary to form a continuous inclined surface 92 90 from the base of the vertical column of fuel to the surface of the grate, such surface approaching the grate very closely at its termination. The hinged plate 90 is provided for this purpose, but offers a yielding under surface to the grates which have been dumped, so that should any clinkers remain which would interfere with the passage under the plate 90, were it rigid, and stop the grate-rotating mechanism such obstructions will be yielded to. A bank of incoming fuel is thus constantly maintained upon the bridge, which seals the space that would otherwise be left between the bridge and the grate at 95, and, moreover, the actual contact of the plate 90 with the grate further insures such closure of the space. The space 96 at the opposite side of the bridge at which the grate approaches is always filled with the ashes preceding their discharge, thus sealing the remaining side of the bridge.

Having thus fully described my invention, what I claim, and desire to secure by Letters Patent, is—

1. The combination, in a rotary grate, of trunnioned sectors and mechanism for automatically imparting to said sectors a complete half-revolution about their trunnions at a given point in the revolution of the grate.

2. The combination, in a rotary grate, of trunnioned sectors, mechanism for automatically imparting to the same a half-revolution about their trunnions at a given point of revolution of the grate, and a bridge covering such dumping-point of the sectors, having a vertical cavity to clear the said dumping movement, and sides proximate to the grate-surfaces, for the purposes set forth.

3. The combination, in a rotary grate, of trunnioned dumping-sectors component of the same, a bridge covering the dumping-point, a vertical gravity-hopper above the bridge, and an inclined surface of the bridge, extending from the base of the hopper to the surface of the grate, approaching the same in the direction of its rotation.

4. The combination, in a rotary grate, of trunnioned dumping-sectors, a bridge covering the dumping-point, a gravity-hopper, an inclined surface of the bridge beneath the hopper, and a hinged plate terminating the inclined surface, resting at its free edge on the grate.

5. The combination, in a rotary grate, of a carrying-frame, dumping-sectors trunnioned radially therein, squared trunnion-heads projecting from the periphery of the frame, a transversely-grooved rotary disk facing the frame in the path of the said squared heads, a pinion, a segment, a tumbling-bob, and a tilting lever connected thereto, as described, the lever intercepting the path of the said trunnions or other projections upon the frame, whereby the groove in the disk is moved to a horizontal position reversed from its normal horizontal position and then released when the head of the trunnion is at its center.

6. In a rotary grate, the combination of a peripheral frame, a central hub, and radial suspending-rods supporting the hub from the periphery.

NAT. W. PRATT.

Witnesses:
C. W. FORBES,
N. MARLER.